(12) United States Patent
Zhao et al.

(10) Patent No.: US 11,847,276 B2
(45) Date of Patent: Dec. 19, 2023

(54) TOUCH SUBSTRATE AND TOUCH DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Xue Zhao, Beijing (CN); Xiaodong Xie, Beijing (CN); Min He, Beijing (CN); Tengfei Zhong, Beijing (CN); Xinxiu Zhang, Beijing (CN); Bin Pang, Beijing (CN); Tianyu Zhang, Beijing (CN); Huayu Sang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/909,106

(22) PCT Filed: Nov. 10, 2021

(86) PCT No.: PCT/CN2021/129766
§ 371 (c)(1),
(2) Date: Sep. 2, 2022

(87) PCT Pub. No.: WO2022/121608
PCT Pub. Date: Jun. 16, 2022

(65) Prior Publication Data
US 2023/0109227 A1     Apr. 6, 2023

(30) Foreign Application Priority Data
Dec. 9, 2020  (CN) .......................... 202011447258.8

(51) Int. Cl.
G06F 3/041     (2006.01)
G06F 3/044     (2006.01)

(52) U.S. Cl.
CPC ........ G06F 3/04164 (2019.05); G06F 3/0445 (2019.05); G06F 2203/04103 (2013.01);
(Continued)

(58) Field of Classification Search
CPC .... G06F 3/0445; G06F 3/0446; G06F 3/0448; G06F 3/04164; G06F 3/041
See application file for complete search history.

(56) References Cited

U.S. PATENT DOCUMENTS

2013/0269991 A1   10/2013   Kim et al.
2016/0299603 A1   10/2016   Tsujioka et al.
(Continued)

FOREIGN PATENT DOCUMENTS

CN     105900049 A     8/2016
CN     109871157 A     6/2019
(Continued)

OTHER PUBLICATIONS

Kim, Seong jun, et al. "Low Cost Fabrication Method for Thin, Flexible, and Transparent Touch Screen Sensors." Advanced Materials Technologies 5.9 (2020): 2000441.
(Continued)

Primary Examiner — Sardis F Azongha
(74) Attorney, Agent, or Firm — IPro, PLLC

(57) ABSTRACT

The present disclosure provides a touch substrate and a touch display device. The touch substrate includes a base substrate, and a first electrode layer and a second electrode layer laminated one on another on the base substrate. The first electrode layer includes first channel patterns and first dummy electrode patterns, the second electrode layer includes second channel patterns and second dummy elec-
(Continued)

trode patterns, the first channel pattern and the second channel pattern are insulated from each other and arranged in such a manner as to cross each other, and the second channel pattern is insulated from the second dummy electrode pattern. Each first dummy electrode pattern includes a first dummy electrode sub-pattern, each second dummy electrode pattern includes a second dummy electrode sub-pattern, and the first dummy electrode sub-pattern is electrically coupled to the first channel pattern and the second dummy electrode sub-pattern.

20 Claims, 4 Drawing Sheets

(52) U.S. Cl.
CPC .............. *G06F 2203/04107* (2013.01); *G06F 2203/04111* (2013.01)

(56) References Cited

U.S. PATENT DOCUMENTS

| 2021/0149525 | A1 | 5/2021 | Xu et al. |
| 2022/0404933 | A1 | 12/2022 | Pang et al. |

FOREIGN PATENT DOCUMENTS

| CN | 110874160 A | 3/2020 |
| CN | 111221436 A | 6/2020 |
| CN | 111475055 A | 7/2020 |
| CN | 111651094 A | 9/2020 |
| CN | 112394844 A | 2/2021 |
| CN | 214670525 U | 11/2021 |
| JP | 2009069297 A | 4/2009 |

OTHER PUBLICATIONS

PCT/CN2021/129766 international search report and written opinion.

TOUCH SUBSTRATE AND TOUCH DISPLAY DEVICE

CROSS-REFERENCE TO RELATED APPLICATIONS

This application is the U.S. national phase of PCT Application No. PCT/CN2021/129766 filed on Nov. 10, 2021, which claims a priority of the Chinese Patent Application No. 202011447258.8 filed on Dec. 9, 2020, the entire contents of which are hereby incorporated by reference.

TECHNICAL FIELD

The present disclosure relates to the field of display technology, in particular to a touch substrate and a touch display device.

BACKGROUND

Usually, a touch module includes a transmitting electrode and a receiving electrode laminated one on another and insulated from each other. In the related art, in order to transmit a signal, a signal transmission line is laminated on the transmitting electrode and the receiving electrode.

SUMMARY

An object of the present disclosure is to provide a touch substrate and a touch display device, so as to simplify a manufacture process of the touch substrate, thereby to reduce the manufacture cost thereof.

In a first aspect, the present disclosure provides in some embodiments a touch substrate, including a base substrate, and a first electrode layer and a second electrode layer laminated one on another on the base substrate. The first electrode layer includes first channel patterns and first dummy electrode patterns, each first channel pattern is configured to transmit a touch detection signal, the second electrode layer includes second channel patterns and second dummy electrode patterns, the first channel pattern and the second channel pattern are insulated from each other and arranged in such a manner as to cross each other, each second channel pattern is configured to receive the touch detection signal from the first channel pattern, and the second channel pattern is insulated from the second dummy electrode pattern. Each first dummy electrode pattern includes a first dummy electrode sub-pattern, each second dummy electrode pattern includes a second dummy electrode sub-pattern, the first dummy electrode sub-pattern is electrically coupled to the first channel pattern and the second dummy electrode sub-pattern, and the first dummy electrode sub-pattern and the second dummy electrode sub-pattern are configured to transmit the touch detection signal to the first channel pattern.

In a possible embodiment of the present disclosure, the touch substrate further includes a first insulation layer, a second insulation layer and a third insulation layer, and the first insulation layer, the first electrode layer, the second insulation layer, the second electrode layer and the third insulation layer are laminated one on another.

In a possible embodiment of the present disclosure, an orthogonal projection of the first insulation layer onto the base substrate coincides with an orthogonal projection of the third insulation layer onto the base substrate.

In a possible embodiment of the present disclosure, the touch substrate includes a via hole penetrating through the second insulation layer, and the first dummy electrode sub-pattern is electrically coupled to the second dummy electrode sub-pattern through the via hole.

In a possible embodiment of the present disclosure, a grid density of the first electrode layer in a region corresponding to the via hole is greater than a grid density of the first electrode layer a region other than the region corresponding to the via hole.

In a possible embodiment of the present disclosure, an orthogonal projection of the via hole onto the base substrate is located at a position where an orthogonal projection of the first dummy electrode sub-pattern onto the base substrate overlaps an orthogonal projection of the second dummy electrode sub-pattern onto the base substrate.

In a possible embodiment of the present disclosure, the orthogonal projection of the first dummy electrode sub-pattern onto the base substrate does not overlap the orthogonal projection of the second dummy electrode sub-pattern onto the base substrate in a region other than a region corresponding to the via hole.

In a possible embodiment of the present disclosure, the first dummy electrode pattern further includes third dummy electrode sub-patterns, the second dummy electrode pattern further includes fourth dummy electrode sub-patterns, the third dummy electrode sub-patterns and the second channel patterns are arranged alternately, and the fourth dummy electrode sub-patterns and the first channel patterns are arranged alternately.

In a possible embodiment of the present disclosure, an orthogonal projection of the third dummy electrode sub-pattern onto the base substrate partially overlaps an orthogonal projection of the second channel pattern onto the base substrate, and/or an orthogonal projection of the fourth dummy electrode sub-pattern onto the base substrate partially overlaps an orthogonal projection of the first channel pattern onto the base substrate.

In a possible embodiment of the present disclosure, a line width of the first electrode layer in a region corresponding to the via hole is greater than a line width of the first electrode layer in regions other than the region corresponding to the via hole, and/or a line width of the second electrode layer in a region corresponding to the via hole is greater than a line width of the second electrode layer in regions other than the region corresponding to the via hole.

In a second aspect, the present disclosure provides in some embodiments a display substrate, including a base substrate and a touch module on the base substrate. The touch module includes a first electrode layer and a second electrode layer crossing each other, the first electrode layer includes first channel patterns and first dummy electrode patterns, each first channel pattern is configured to transmit a touch detection signal, the second electrode layer includes second channel patterns and second dummy electrode patterns, the first channel pattern and the second channel pattern are insulated from each other, each second channel pattern is configured to receive the touch detection signal from the first channel pattern, and the second channel pattern is insulated from the second dummy electrode pattern. Each first dummy electrode pattern includes a first dummy electrode sub-pattern, each second dummy electrode pattern includes a second dummy electrode sub-pattern, the first dummy electrode sub-pattern is electrically coupled to the first channel pattern and the second dummy electrode sub-pattern, and the first dummy electrode sub-pattern and the second dummy electrode sub-pattern are configured to transmit the touch detection signal to the first channel pattern.

In a possible embodiment of the present disclosure, the touch module further includes a first protection layer, a second protection layer and a third protection layer, the first protection layer, the first electrode layer, the second protection layer, the second electrode layer and the third protection layer are laminated one on another along a direction away from the base substrate, and an orthogonal projection of the first protection layer onto the base substrate coincides with an orthogonal projection of the third protection layer onto the base substrate.

In a possible embodiment of the present disclosure, the display substrate includes a via hole penetrating through the second protection layer, and the first dummy electrode sub-pattern is electrically coupled to the second dummy electrode sub-pattern through the via hole.

In a possible embodiment of the present disclosure, an orthogonal projection of the via hole onto the base substrate is located between an orthogonal projection of the first dummy electrode sub-pattern onto the base substrate and an orthogonal projection of the second dummy electrode pattern onto the base substrate.

In a possible embodiment of the present disclosure, the orthogonal projection of the first dummy electrode sub-pattern onto the base substrate does not overlap the orthogonal projection of the second dummy electrode sub-pattern onto the base substrate do not overlap in regions other than the region corresponding to the via hole.

In a possible embodiment of the present disclosure, the first dummy electrode pattern further includes a third dummy electrode sub-pattern, the second dummy electrode pattern further includes a fourth dummy electrode sub-pattern, an orthogonal projection of the third dummy electrode sub-pattern onto the base substrate does not overlap an orthogonal projection of the fourth dummy electrode sub-pattern onto the base substrate.

In a possible embodiment of the present disclosure, the orthogonal projection of the third dummy electrode sub-pattern onto the base substrate overlaps an orthogonal projection of the second channel pattern onto the base substrate overlap, and/or the orthogonal projection of the fourth dummy electrode sub-pattern onto the base substrate overlaps an orthogonal projection of the first channel pattern onto the base substrate.

In a third aspect, the present disclosure provides in some embodiments a touch display device including the above-mentioned touch substrate.

According to the embodiments of the present disclosure, the first dummy electrode sub-pattern and the second dummy electrode sub-pattern serve as lines for transmitting the touch control signal without any additional wiring layer, so it is able to save a patterning process, i.e., reduce one mask, thereby to simplify the manufacture process and reduce the manufacture cost.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a touch substrate.

Figure 1:
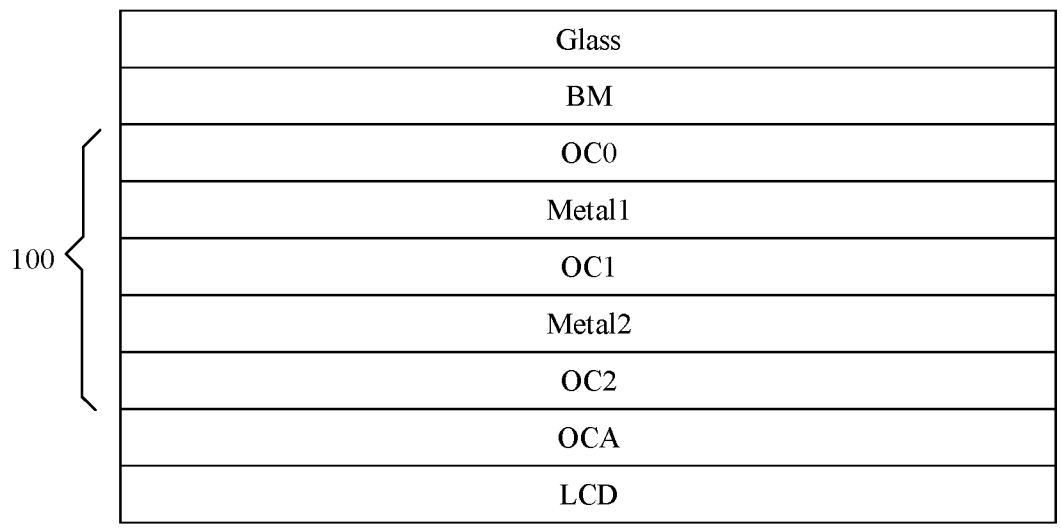
FIG. 1 is a schematic view of a touch display device according to one embodiment of the present disclosure.

The touch substrate includes a base substrate and a touch module 100 on the base substrate. As shown in FIG. 1, specifically, in a possible embodiment of the present disclosure, the touch substrate includes the base substrate made of glass (such as a glass substrate), and the touch module 100.

The touch module 100 includes a first electrode layer Metal2 and a second electrode layer Metal1. The first electrode layer Metal2 and the second electrode layer Metal1 are formed through a metal mesh in such a manner that the first electrode layer Metal2 and the second electrode layer Metal1 cross each other.

Figure 2:
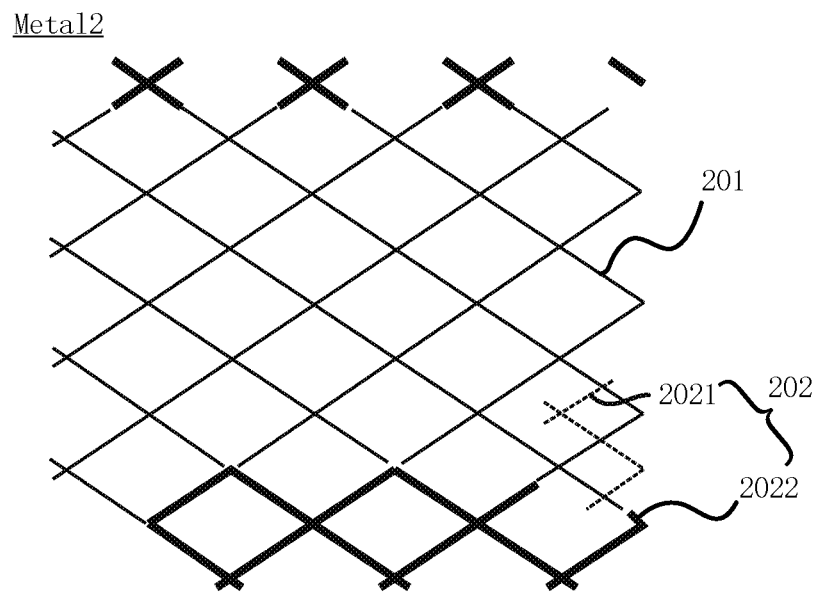
FIG. 2 is a schematic view of a first electrode layer according to one embodiment of the present disclosure.
Figure 3:
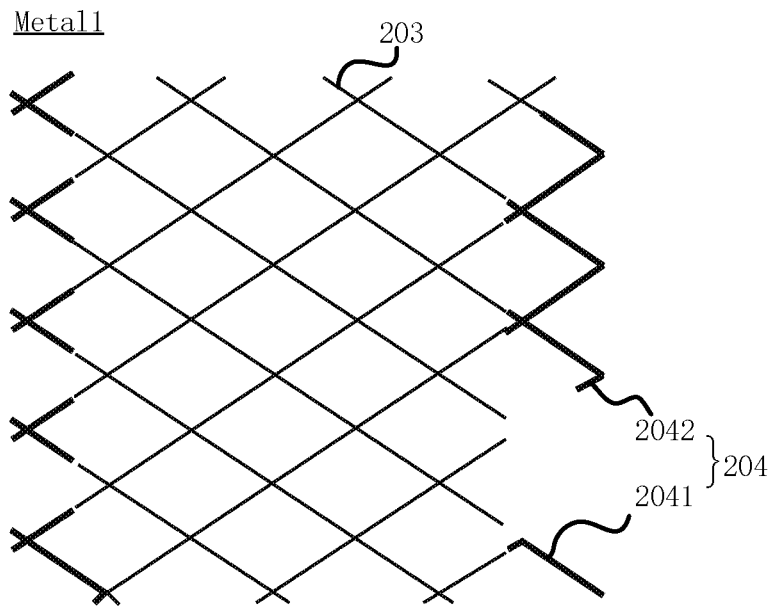
FIG. 3 is a schematic view of a second electrode layer according to one embodiment of the present disclosure.
Figure 4:
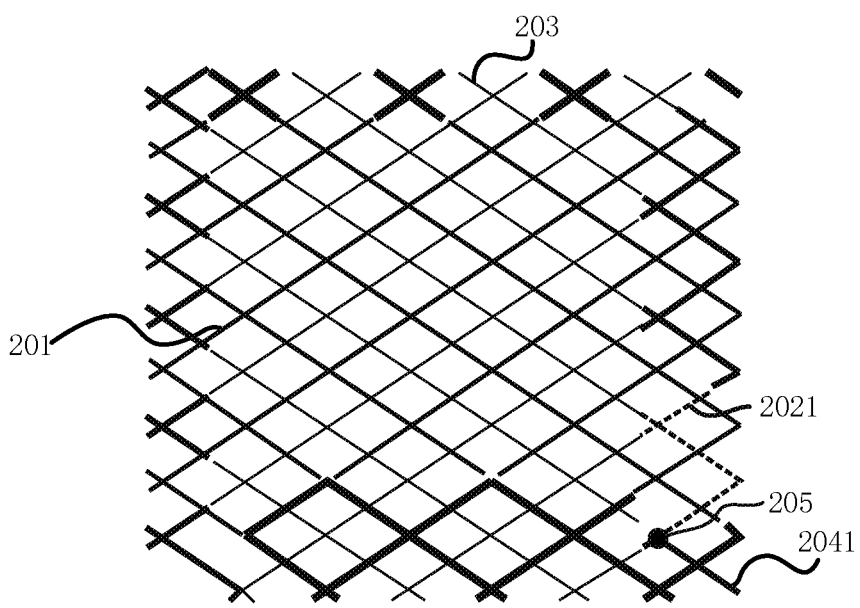
FIG. 4 is a schematic view showing the first electrode layer and the second electrode layer laminated one on another according to one embodiment of the present disclosure.

As shown in FIGS. 2 to 4, the first electrode layer Metal2 includes first channel patterns 201 and first dummy electrode patterns 202, and the second electrode layer Metal1 includes second channel patterns 203 and second dummy electrode patterns 204. The first channel pattern 201 is insulated from the second channel pattern 203, and the second channel pattern 203 is insulated from the second dummy electrode pattern 204.

It should be appreciated that, lines at different widths in FIGS. 2-4 are merely used to distinguish structures but shall not be construed as limiting actual widths of the structures.

In the embodiments of the present disclosure, the first channel pattern 201 is configured to transmit a touch driving signal, so the first channel pattern 201 is also referred to as a driving electrode. The second channel pattern 203 is configured to sense the touch driving signal, so the second channel pattern 203 is also referred to as a sensing electrode.

As shown in FIG. 2, the first dummy electrode pattern 202 is arranged at a same layer and made of a same material as the first channel pattern 201, i.e., the first dummy electrode pattern 202 and the first channel pattern 201 are formed through a single patterning process. Similarly, as shown in FIG. 3, the second dummy electrode pattern 204 is arranged at a same layer and made of a same material as the second channel pattern 203.

It should be appreciated that, the dummy electrodes, such as the first dummy electrode pattern 202 and the second dummy electrode pattern 204, do not function as to transmit or sense any touch detection signal. On one hand, the dummy electrodes are used to balance a visual effect, and prevent the occurrence of Moire patterns due to optical interference at a region where no receiving electrode or transmitting electrode is arranged, for example, a region where no first electrode pattern or second electrode pattern is arranged. On the other hand, during the manufacture, through the dummy electrodes, it is able to ensure uniformity of the patterns, e.g., utilize an etchant evenly in an etching process.

The first dummy electrode pattern 202 includes a first dummy electrode sub-pattern 2021, the second dummy electrode pattern 204 includes a second dummy electrode sub-pattern 2041, the first dummy electrode sub-pattern 2021 is electrically coupled to the first channel pattern 201 and the second dummy electrode sub-pattern 2041, the first dummy electrode sub-pattern 2021 and the second dummy electrode sub-pattern 2041 are electrically coupled to each other, and the first channel pattern 201 is configured to transmit the touch driving signal through the first dummy electrode sub-pattern 2021 and the second dummy electrode sub-pattern 2041.

As shown in FIG. 3, in the embodiments of the present disclosure, the second dummy electrode sub-pattern 2041 is a continuous curved line, so the second dummy electrode sub-pattern 2041 serves as a line for transmitting the touch control signal. The other dummy electrode patterns are interrupted, or are continuously arranged in a floating manner.

When the first dummy electrode pattern 202 includes a first dummy electrode sub-pattern 2021 and the second dummy electrode pattern 204 includes a second dummy electrode sub-pattern 2041, it may be understood as that a part of the first dummy electrode pattern 202 and a part of the second dummy electrode pattern 204, i.e. the above-mentioned first dummy sub-pattern and second dummy sub-pattern, are used as signal transmission lines for the sensing electrode.

According to the embodiments of the present disclosure, the first dummy electrode sub-pattern 2021 and the second dummy electrode sub-pattern 2041 serve as lines for transmitting the touch driving signal without any additional wiring layer, so it is able to save one patterning process, i.e., reduce one mask, thereby to simplify the manufacture process and reduce the manufacture cost.

In some embodiments of the present disclosure, the touch module 100 further includes a first insulation layer OC0, a second insulation layer OC1 and a third insulation layer OC2. The first insulation layer OC0, the second electrode layer Metal1, the second insulation layer OC1, the first electrode layer Metal2 and the third insulation layer OC2 are laminated one on another along a direction away from the base substrate, and an orthogonal projection of the first insulation layer OC0 onto the base substrate coincides with an orthogonal projection of the third insulation layer OC2 onto the base substrate.

As shown in FIG. 1, in the embodiments of the present disclosure, the first electrode layer Metal2 and the second electrode layer Metal1 of the touch module 100 are located between the first insulation layer OC0 and the third insulation layer OC2, so in a region corresponding to the first electrode layer Metal2 and the second electrode layer Metal1, each of the first insulation layer OC0 and the third insulation layer OC2 is formed as an entire layer. In other words, at the region corresponding to the first electrode layer Metal2 and the second electrode layer Metal1, a shape of the first insulation layer OC0 is the same as a shape of the third insulation layer OC2, i.e., the orthogonal projection of the first insulation layer OC0 onto the base substrate coincides with the orthogonal projection of the third insulation layer OC2 onto the base substrate.

The first insulation layer OC0 and the third insulation layer OC2 are formed through a same mask, so it is able to save one mask, thereby to reduce the manufacture cost.

In some embodiments of the present disclosure, the touch substrate includes a via hole 205 penetrating through the second insulation layer OC1.

As shown in FIG. 4, an orthogonal projection of the via hole 205 onto the base substrate is located at a position where the orthogonal projection of the first dummy electrode sub-pattern 2021 onto the base substrate overlaps the orthogonal projection of the second dummy electrode pattern 2041 onto the base substrate, and the first dummy electrode sub-pattern 2021 is electrically coupled to the second dummy electrode sub-pattern 2041 through the via hole 205.

In the embodiments of the present disclosure, the via hole 205 is formed in the second insulation layer OC1 so that the first dummy electrode sub-pattern 2021 is electrically coupled to the second dummy electrode sub-pattern 2041.

In some embodiments of the present disclosure, the orthogonal projection of the first dummy electrode sub-pattern 2021 onto the base substrate does not overlap the orthogonal projection of the second dummy electrode sub-pattern 2041 onto the base substrate in regions other than a region corresponding to the via hole 205.

In the embodiments of the present disclosure, no second dummy electrode sub-pattern 2041 is formed in the region where the orthogonal projection of the first dummy electrode sub-pattern 2021 onto the base substrate is located, and the orthogonal projection of the first dummy electrode sub-pattern 2021 onto the base substrate merely overlaps the orthogonal projection of the second dummy electrode sub-pattern 2041 onto the base substrate at the via hole 205.

In the related art, the orthogonal projection of the second dummy electrode pattern 204 formed at a same layer as the second electrode layer Metal1 onto the base substrate overlaps the orthogonal projection of the first electrode pattern onto the base substrate, so a capacitor is formed between the second dummy electrode pattern 204 and the first electrode pattern, and thereby the signal transmission is adversely affected.

As compared with the related art, in the embodiments of the present disclosure, a part of the second dummy electrode pattern 204, i.e., the first dummy electrode sub-pattern 2021, is formed with the first electrode layer Metal2 simultaneously. In this way, it is able to, on one hand, improve a contact effect between the first dummy electrode sub-pattern 2021 and the first channel pattern 201, and on the other hand, reduce a capacitance between the first electrode layer Metal2 and the second electrode layer Metal1, thereby to prevent the occurrence of an abnormal signal.

In addition, in the embodiments of the present disclosure, it is able to reduce the quantity of via holes, thereby to prevent the occurrence of the abnormal signal.

As shown in FIG. 2, in the region corresponding to the via hole 205, the first electrode layer Metal2 includes the first channel pattern 201 and the first dummy electrode sub-pattern 2021, so a grid density of the first electrode layer Metal2 in the region corresponding to the via hole 205 is greater than a grid density of the first electrode layer Metal2 in a region other than the region corresponding to the via hole 205.

In some embodiments of the present disclosure, the orthogonal projection of the via hole 205 onto the base substrate is located at a position where the orthogonal projection of the first dummy electrode sub-pattern 2021 onto the base substrate overlaps the orthogonal projection of the second dummy electrode pattern 204 onto the base substrate.

In the embodiments of the present disclosure, the via hole 205 is formed in the second insulation layer OC1 at a position between the first dummy electrode sub-pattern 2021 and the second dummy electrode pattern 204, so that the first dummy electrode sub-pattern 2021 is electrically coupled to the second dummy electrode pattern 204 through the via hole 205. In addition, the orthogonal projection of the first dummy electrode sub-pattern 2021 onto the base substrate does not overlap the orthogonal projection of the second dummy electrode pattern 204 onto the base substrate in the regions other than the region corresponding to the via hole 205, so as to reduce the capacitance between the first electrode layer Metal2 and the second electrode layer Metal1.

In some embodiments of the present disclosure, a line width of the first electrode layer Metal2 in a region corresponding to the via hole 205 is greater than a line width of the first electrode layer Metal2 in regions other than the region corresponding to the via hole 205, and/or a line width of the second electrode layer Metal1 in the region corresponding to the via hole 205 is greater than a line width of the second electrode layer Metal1 in regions other than the region corresponding to the via hole 205.

As shown in FIGS. 5 to 8, in some embodiments of the present disclosure, an extended portion is formed at the region corresponding to the via hole 205, so as to improve the reliability of the electrical connection.

Figure 5:
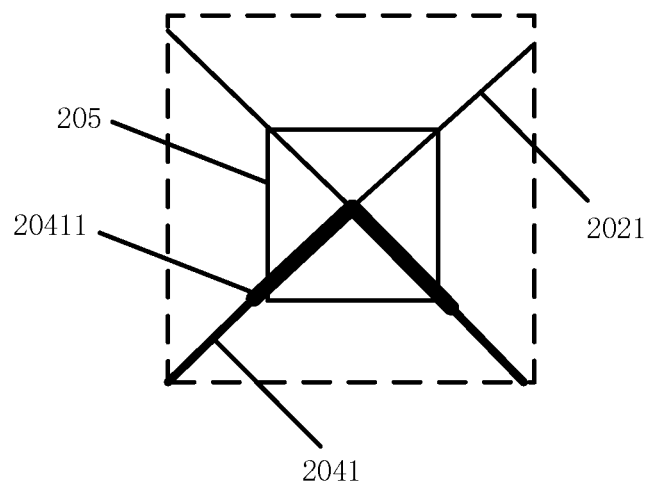
FIG. 5 is a partial schematic view of a via hole according to one embodiment of the present disclosure.
Figure 6:
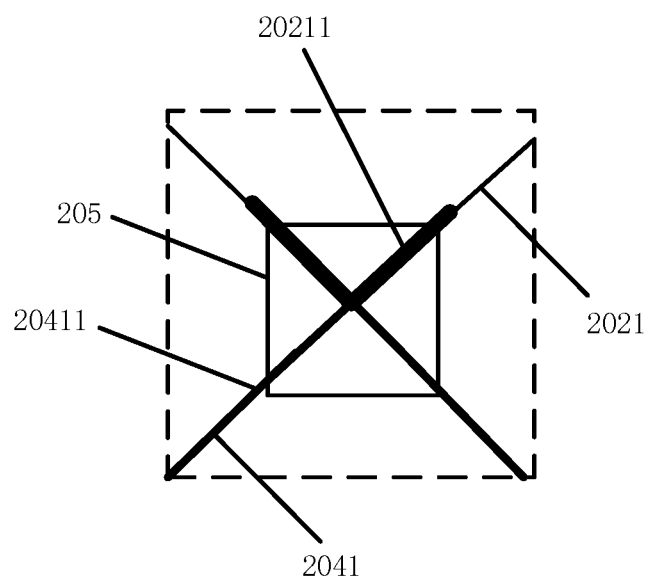
FIG. 6 is another partial schematic view of the via hole according to one embodiment of the present disclosure.
Figure 7:
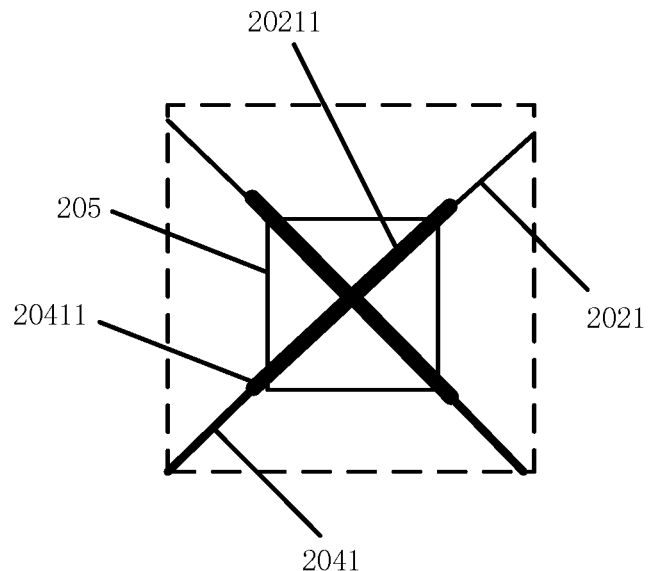
FIG. 7 is yet another partial schematic view of the via hole according to one embodiment of the present disclosure.

As shown in FIG. 5, in a possible embodiment of the present disclosure, the second dummy electrode sub-pattern 2041 forms a first extended portion 20411. As shown in FIG. 6, in another possible embodiment of the present disclosure, the first dummy electrode sub-pattern 2021 forms a second extended portion 20211. As shown in FIG. 7, in yet another possible embodiment of the present disclosure, the second dummy electrode sub-pattern 2041 forms the first extended portion 20411 and the first dummy electrode sub-pattern 2021 forms the second extended portion 20211.

The extended portion in the embodiments of the present disclosure is formed by conductive materials reserved during the etching, so as to increase a size of the line typically through, e.g., increasing the line width.

Figure 8:
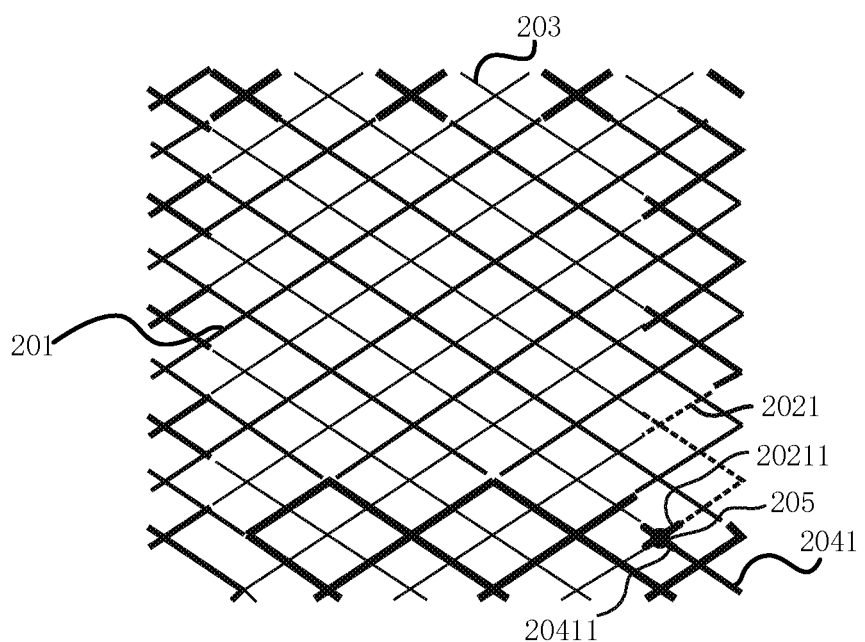
FIG. 8 is another schematic view showing the first electrode layer and the second electrode layer laminated one on another according to one embodiment of the present disclosure.

As shown in FIG. 8, through the portion, it is able to improve an electrical contact effect between the first dummy electrode sub-pattern 2021 and the second dummy electrode sub-pattern 2041, improve the connection reliability between the first dummy electrode sub-pattern 2021 and the second dummy electrode sub-pattern 2041, and prevent the occurrence of an open circuit. In addition, the second dummy electrode sub-pattern 2041 is also provided with a similar extended portion at an edge of the touch substrate, so as to improve the connection reliability of the circuit.

As shown in FIGS. 2 and 3, in some embodiments of the present disclosure, each first dummy electrode pattern 202 further includes a third dummy electrode sub-pattern 2022 and each second dummy electrode pattern 204 further includes a fourth dummy electrode sub-pattern 2042.

The third dummy electrode sub-pattern 2022 refers to a portion of the first dummy electrode pattern 202 other than the first dummy electrode sub-pattern 2021, and the fourth dummy electrode sub-pattern 2042 refers to a portion of the second dummy electrode pattern 204 other than the second dummy electrode sub-pattern 2041.

The third dummy electrode sub-patterns 2022 and the second channel patterns 203 are arranged alternately, and the fourth dummy electrode sub-patterns 2042 and the first channel patterns 201 are arranged alternately.

As shown in FIG. 4, when the third dummy electrode sub-patterns 2022 and the second channel patterns 203 are arranged alternately, it means that, except for an outermost position, each third dummy electrode sub-pattern 2022 is located between two adjacent second channel patterns 203, and each second channel pattern 203 is located between two adjacent third dummy electrode sub-patterns 2022. Similarly, each fourth dummy electrode sub-pattern 2042 is located between two adjacent first channel patterns 201, and each first channel pattern 201 is located between two adjacent fourth dummy electrode sub-patterns 2042.

An overlapping area between the orthogonal projection of the third dummy electrode sub-pattern 2022 onto the base substrate and the orthogonal projection of the fourth dummy electrode sub-pattern 2042 onto the base substrate should be as small as possible to further reduce the capacitance between the first electrode layer Metal2 and the second electrode layer Metal1.

In some embodiments of the present disclosure, the orthogonal projection of the third dummy electrode sub-pattern 2022 onto the base substrate partially overlaps the orthogonal projection part of the second channel pattern 203 onto the base substrate; and/or the orthogonal projection of the fourth dummy electrode sub-pattern 2042 onto the base substrate partially overlaps the orthogonal projection of the first channel pattern 201 onto the base substrate.

When the orthogonal projection of the third dummy electrode sub-pattern 2022 onto the base substrate overlaps the orthogonal projection of the second channel pattern 203 onto the base substrate and the orthogonal projection of the fourth dummy electrode sub-pattern 2042 overlaps the orthogonal projection of the first channel pattern 201 onto the base substrate, it is able to improve the uniformity of the entire display panel, and prevent the occurrence of Moire patterns, thereby to improve the display effect.

The present disclosure further provides in some embodiments a touch display device including the above-mentioned display substrate.

Specifically, as shown in FIG. 1, the touch display device includes a base substrate, and a black matrix (BM), a touch module 100, an optically clear adhesive OCA and a display element laminated one on another in a direction away from the base substrate.

In the embodiments of the present disclosure, the display element may be a liquid crystal display (LCD) element, an organic light-emitting diode (OLED) element, or the like, which will not be particularly defined herein.

When the touch display device includes the above-mentioned touch substrate, the touch display device at least has the above-mentioned technical effects, which will not be particularly defined herein.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch substrate, comprising a base substrate, and a first electrode layer and a second electrode layer laminated one on another on the base substrate, wherein
the first electrode layer comprises first channel patterns and first dummy electrode patterns, each first channel pattern is configured to transmit a touch detection signal, the second electrode layer comprises second channel patterns and second dummy electrode patterns, the first channel pattern and the second channel pattern are insulated from each other and arranged in such a manner as to cross each other, each second channel pattern is configured to receive the touch detection signal from the first channel pattern, and the second channel pattern is insulated from the second dummy electrode patter; and
each first dummy electrode pattern comprises a first dummy electrode sub-pattern, each second dummy electrode pattern comprises a second dummy electrode sub-pattern, the first dummy electrode sub-pattern is electrically coupled to the first channel pattern and the second dummy electrode sub-pattern, and the first dummy electrode sub-pattern and the second dummy electrode sub-pattern are configured to transmit the touch detection signal to the first channel pattern.

2. The touch substrate according to claim 1, further comprising a first insulation layer, a second insulation layer and a third insulation layer, wherein the first insulation layer, the first electrode layer, the second insulation layer, the second electrode layer and the third insulation layer are laminated one on another.

3. The touch substrate according to claim 2, wherein
an orthogonal projection of the first insulation layer onto the base substrate coincides with an orthogonal projection of the third insulation layer onto the base substrate.

4. The touch substrate according to claim 2, further comprising a via hole penetrating through the second insulation layer, wherein the first dummy electrode sub-pattern is electrically coupled to the second dummy electrode sub-pattern through the via hole.

5. The touch substrate according to claim 4, wherein a grid density of the first electrode layer in a region corresponding to the via hole is greater than a grid density of the first electrode layer a region other than the region corresponding to the via hole.

6. The touch substrate according to claim 4, wherein an orthogonal projection of the via hole onto the base substrate is located at a position where an orthogonal projection of the first dummy electrode sub-pattern onto the base substrate overlaps an orthogonal projection of the second dummy electrode sub-pattern onto the base substrate.

7. The touch substrate according to claim 6, wherein a line width of the first electrode layer in a region corresponding to the via hole is greater than a line width of the first electrode layer in regions other than the region corresponding to the via hole, and/or a line width of the second electrode layer in a region corresponding to the via hole is greater than a line width of the second electrode layer in regions other than the region corresponding to the via hole.

8. The touch substrate according to claim 4, wherein the orthogonal projection of the first dummy electrode sub-pattern onto the base substrate does not overlap the orthogonal projection of the second dummy electrode sub-pattern onto the base substrate in a region other than a region corresponding to the via hole.

9. The touch substrate according to claim 8, wherein the first dummy electrode pattern further comprises third dummy electrode sub-patterns, the second dummy electrode pattern further comprises fourth dummy electrode sub-patterns, the third dummy electrode sub-patterns and the second channel patterns are arranged alternately, and the fourth dummy electrode sub-patterns and the first channel patterns are arranged alternately.

10. The touch substrate according to claim 9, wherein an orthogonal projection of the third dummy electrode sub-pattern onto the base substrate partially overlaps an orthogonal projection of the second channel pattern onto the base substrate, and/or an orthogonal projection of the fourth dummy electrode sub-pattern onto the base substrate partially overlaps an orthogonal projection of the first channel pattern onto the base substrate.

11. A touch display device, comprising the touch substrate according to claim 1.

12. The touch display device according to claim 11, wherein the touch substrate further comprises a first insulation layer, a second insulation layer and a third insulation layer, wherein the first insulation layer, the first electrode layer, the second insulation layer, the second electrode layer and the third insulation layer are laminated one on another.

13. The touch display device according to claim 12, wherein an orthogonal projection of the first insulation layer onto the base substrate coincides with an orthogonal projection of the third insulation layer onto the base substrate.

14. The touch display device according to claim 12, wherein the touch substrate further comprises a via hole penetrating through the second insulation layer, wherein the first dummy electrode sub-pattern is electrically coupled to the second dummy electrode sub-pattern through the via hole.

15. The touch display device according to claim 14, wherein a grid density of the first electrode layer in a region corresponding to the via hole is greater than a grid density of the first electrode layer a region other than the region corresponding to the via hole.

16. The touch display device according to claim 14, wherein an orthogonal projection of the via hole onto the base substrate is located at a position where an orthogonal projection of the first dummy electrode sub-pattern onto the base substrate overlaps an orthogonal projection of the second dummy electrode sub-pattern onto the base substrate.

17. The touch display device according to claim 16, wherein a line width of the first electrode layer in a region corresponding to the via hole is greater than a line width of the first electrode layer in regions other than the region corresponding to the via hole, and/or a line width of the second electrode layer in a region corresponding to the via hole is greater than a line width of the second electrode layer in regions other than the region corresponding to the via hole.

18. The touch display device according to claim 14, wherein the orthogonal projection of the first dummy electrode sub-pattern onto the base substrate does not overlap the orthogonal projection of the second dummy electrode sub-pattern onto the base substrate in a region other than a region corresponding to the via hole.

19. The touch display device according to claim 18, wherein the first dummy electrode pattern further comprises third dummy electrode sub-patterns, the second dummy electrode pattern further comprises fourth dummy electrode sub-patterns, the third dummy electrode sub-patterns and the second channel patterns are arranged alternately, and the fourth dummy electrode sub-patterns and the first channel patterns are arranged alternately.

20. The touch display device according to claim 19, wherein an orthogonal projection of the third dummy electrode sub-pattern onto the base substrate partially overlaps an orthogonal projection of the second channel pattern onto the base substrate, and/or an orthogonal projection of the fourth dummy electrode sub-pattern onto the base substrate partially overlaps an orthogonal projection of the first channel pattern onto the base substrate.

\* \* \* \* \*